Oct. 25, 1932.  J. LEDWINKA  1,883,992
VEHICLE BODY CONSTRUCTION
Filed May 29, 1930   2 Sheets-Sheet 1

INVENTOR.
JOSEPH LEDWINKA
BY John P. Barbox
ATTORNEY.

Oct. 25, 1932.  J. LEDWINKA  1,883,992
VEHICLE BODY CONSTRUCTION
Filed May 29, 1930    2 Sheets-Sheet 2
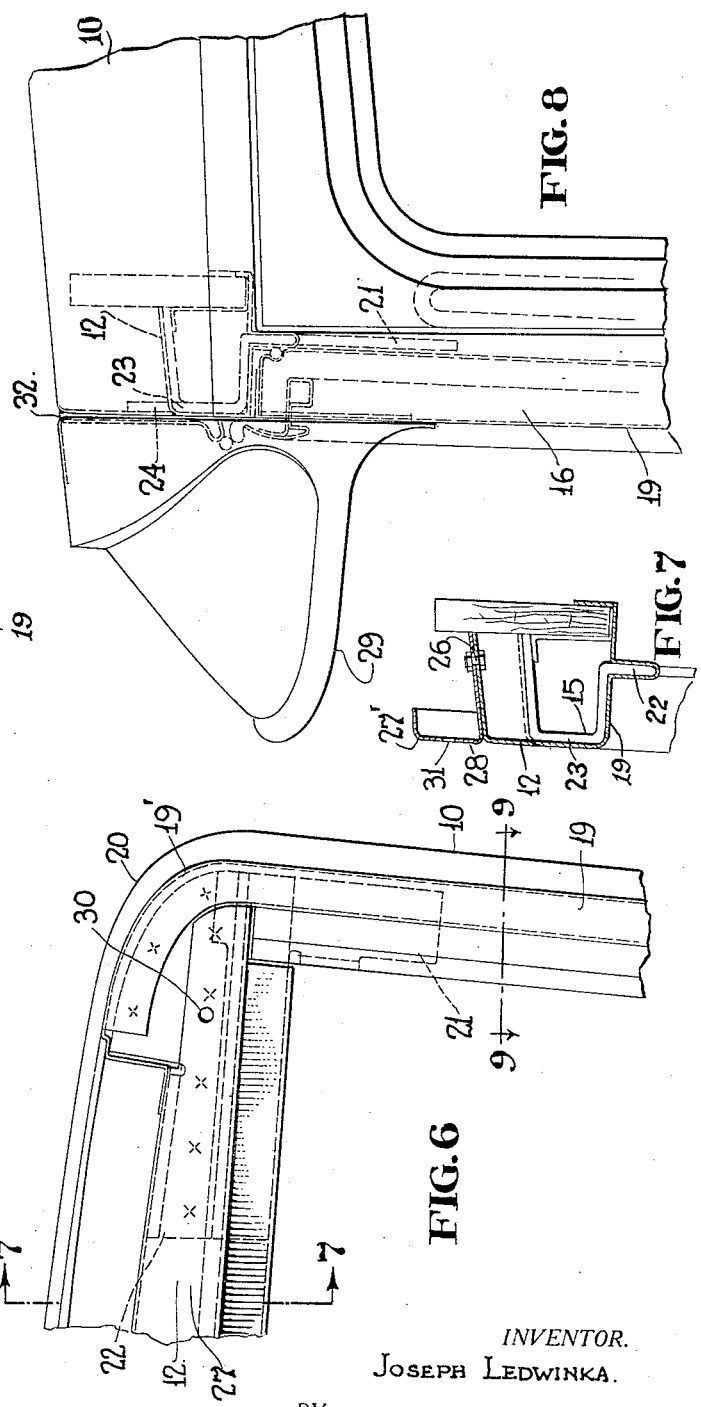
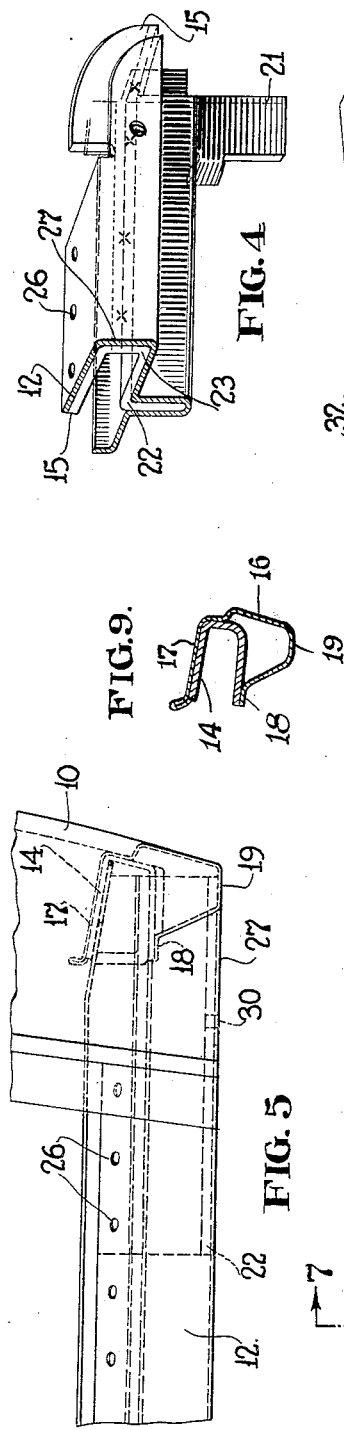
INVENTOR.
JOSEPH LEDWINKA.
BY
John P. Barbos
ATTORNEY.

Patented Oct. 25, 1932

1,883,992

UNITED STATES PATENT OFFICE

JOSEPH LEDWINKA, OF PHILADELPHIA, PENNSYLVANIA, ASSIGNOR TO EDWARD G. BUDD MANUFACTURING COMPANY, OF PHILADELPHIA, PENNSYLVANIA, A CORPORATION OF PENNSYLVANIA

VEHICLE BODY CONSTRUCTION

Application filed May 29, 1930. Serial No. 456,835.

My invention relates to automobile bodies and particularly to the front construction of closed vehicle bodies.

It is a main object of my invention to provide a simplified construction for bodies of the class first assembled in a number of unitary sub-assemblies at the plant of the body manufacturer well adapted for shipping, and finally assembled only when they have been shipped to the desired destination for such assembly. It is a particular object of my invention to so construct the parts of the sub-assemblies as to facilitate their final assembly.

These objects are attained in large measure by the construction of the unit assemblies and by their terminal conformation, so as to provide final assembly joint structures which are open and well adapted for applying the securing means. They are attained further by the details of construction all as will appear in the detailed description in the following specification when read in connection with the accompanying drawings forming a part hereof.

In the drawings,

Fig. 4 is a detail perspective of the bracket showing the transverse header paneling applied.

Figs. 5 and 6 are, respectively, a top plan view and a front elevational view of the upper portion of the body before the assembly of the visor.

Fig. 7 is a transverse section through the upper windshield header and roof edge taken approximately on the line 7—7 of Fig. 6.

Fig. 8 is a side elevational view of the upper front portion of the vehicle body according to the invention, completely assembled.

Fig. 9 is a detail sectional view taken approximately on line 9—9 of Fig. 6.

Figure 1:
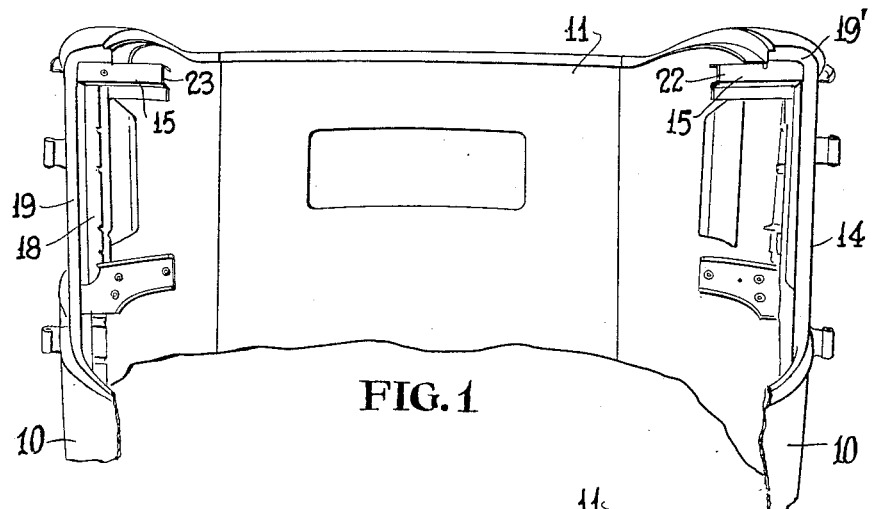
Fig. 1 is a front perspective view of a body to which the invention is shown applied, partially assembled.
Figure 2:
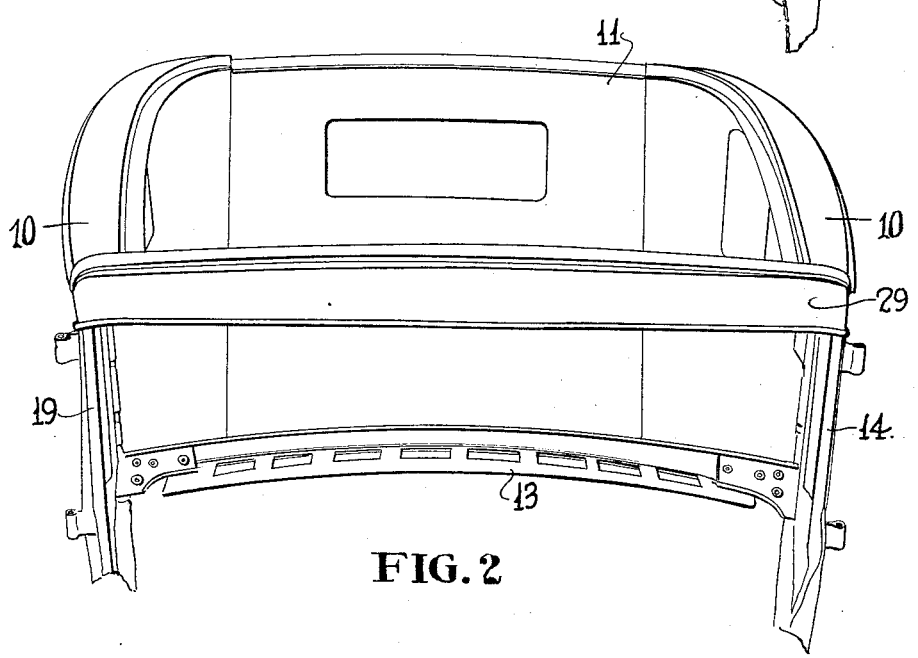
Fig. 2 is a corresponding view showing the body in a further stage of the assembly.
Figure 3:
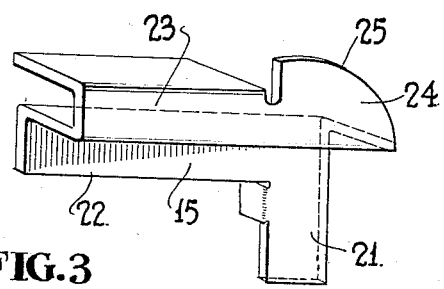
Fig. 3 is a detail perspective view of a bracket employed.

In the drawings, I have shown my invention applied to a body made up of the side units 10, joined at the back, by a back unit 11, and at the front by upper and lower windshield header panels 12, 13 and a cowl top unit (not shown).

It will be obvious, however, that some of the features thereof may be applicable to bodies built up in a different manner, and the invention concerns itself more particularly with the construction and manner of assembly of the body around the windshield opening.

According to this embodiment of my invention, the side units 10 include a front post stamping 14 of inwardly facing channel section which is extended upwardly by a bracket 15 for attachment to adjacent paneling and adjacent units. The side paneling 16 is applied to the outside of the post and secured to the front and rear side walls thereof through the inwardly extending flanges 17 and 18. The forward wall 19 of the paneling of the front post structure is flattened transversely, and extended upwardly above the post stamping proper through the curved edge flange 19', conforming to the arched top 20 of the side panel ending inwardly to form the side quarter of the roof. The post stamping 14 and paneling 16 secured thereto together form the front post structure.

The post proper 14 is extended upwardly and inwardly by the bracket 15 which has a downwardly extending branch 21 secured inside the front wall of the post as by welding, and an inwardly extending arm 22. The inwardly extending arm is formed at the top with a forwardly extending portion, of rearwardly open channel section 23 in its inner portion, which merges in its outer portion into an upwardly and rearwardly facing angle section, the vertical arm 24 of which is in the vertical plane of the bottom wall of the channel section portion 23 and substantially in the plane of the flat forward wall 19 of the post paneling 16.

The arm 24 is offset rearwardly of said wall, the thickness of the paneling, and its top edge 25 is curved to conform to the curvature of the arched top 20 of the panel, and fits in the angle between said panel and the flange 19', extending the front flat wall 19 of the panel vertically and is secured thereto by spot welding, see Fig. 6.

Joining the side units at the top, but in a plane below the top of the arched side portion 20 of the paneling forming a part of the roof, is a transverse header 12, which may take the form of a panel stamping of substantially the same gauge as the side panels. At its ends the header panel stamping telescopes the inwardly extending portions 22, 23 of the oppositely extending brackets 15 and is secured thereto by spot welding. Its substantially flat top wall and the corresponding wall of the channel section portions 23 of the brackets 15 are provided with holes 26 for the passage of the roof securing means. The front wall 27 of the transverse header panel, being applied directly to the front wall of the channel section portion 23 of the bracket, as by spot welding, is in the same vertical plane with the front wall of the side units formed by the portions 19 and 19', see Figs. 4 and 6.

The roof unit 27', as clearly appears in Fig. 7, is similarly terminated by a vertical flat front face 28 substantially in the plane of the flat front faces 19, 19' of front post portion of the side panels and the front face 27 of the transverse header panel, thereby providing an extensive flat face, through the front terminations of these three units, the post structures, the transverse header, and the roof unit finally inserted between tops of the side units, in the same vertical plane. Against this face the visor 29 can be directly applied and secured through securing means, such as bolts, not shown, passing through holes as 30, passing through the front wall of the brackets and header panel and corresponding holes 31, in the front wall of the roof panel. Between the visor 29 and the face against which it is secured, may be applied a suitable weather strip, as 32, Fig. 8.

What I claim is:

1. In a vehicle body structure, front post structures extending inwardly at the top and formed with a substantially flat forward face, a cross member connecting said post structures having its top below the level of said inwardly extended portions and its front face in substantially the plane of the flat forward face of the post structures, and a roof section connecting the inwardly extended portions of the posts and having its front face substantially flat and in the plane of the front post structures and cross member, whereby an extended substantially flat face is formed for the attachment of the visor.

2. In a vehicle body structure, a front post of inwardly facing channel section, a member extending said post upwardly and inwardly, to conform with the arched side of the roof, paneling flanged inwardly and applied through said flange to the front face of said post and extension, and another panel applied to the front face of said inward extension in the plane of said flange.

3. In a vehicle body structure, front post structures extending inwardly at the top to conform to the side quarter portions of the roof, cross connections between the post structures below the top of the said post structures which conform to the quarter portion of the roof, a roof unit overlying and in engagement with said cross members, all of said members terminating at the front in a substantially flat vertical plane to provide a continuous flat surface.

4. In a vehicle body structure, side units having the front post portions at the sides of the windshield opening and extended inwardly at the top to form the sides of the roof, a cross connection for the side units having its top below the plane of the tops of the inwardly extended portions of the side units, and a roof unit overlying said cross connection and forming with the side portions of the roof formed by the side units the complete width of the roof at the front, said side units cross connection and roof unit terminating at the front in a common plane adapted to have the visor directly applied and secured thereto.

5. In a vehicle body structure, a front post comprising an inwardly facing channel stamping, a bracket secured to the top of the post and having a portion forming an upward and inward extension of said post stamping in the plane of the front wall of said post, and paneling applied to said post and extended inwardly to form the side portion of the roof, said paneling being flanged inwardly and secured to the front side wall of the post stamping and its upward extension.

6. In a vehicle body structure, a bracket for attachment to the top of a front post and having a portion extending the front wall of the post upwardly and curved on its outer edge to conform substantially to the side quarter of the roof, a portion extending inwardly for the attachment of a cross member, said inwardly extending portion being provided with flat top wall adapted to receive and secure a roof unit.

7. A bracket for vehicle body structure comprising an arm adapted to extend into the top of a post and be secured thereto, an upward extension curved on its outer edge to conform substantially to the side quarter of the roof and an inward extension of rearwardly facing channel section adapted to be secured to a transverse header and a roof unit.

8. In a vehicle body structure, side units including front post portions, said units being arched inwardly at the top to form the side quarters of the roof and terminating at the front in the front plane of the front post structure, a cross member connecting the front post portions of the side units and having its top surface disposed below the top of said side units and a roof unit overlying and in engagement with said cross member, all of said units terminating at the front in substantially the same vertical plane forming the side and top outer faces of the windshield frame.

In testimony whereof I hereunto affix my signature.

JOSEPH LEDWINKA.